United States Patent
Farquhar et al.

(10) Patent No.: US 11,507,730 B1
(45) Date of Patent: Nov. 22, 2022

(54) USER INTERFACE WITH COMMAND-LINE LINK CREATION FOR GENERATING GRAPHICAL OBJECTS LINKED TO THIRD-PARTY CONTENT

(71) Applicants: Atlassian Pty Ltd., Sydney (AU); Atlassian Inc., San Francisco, CA (US)

(72) Inventors: Scott Farquhar, Sydney (AU); Jonathan George Katahanas, Sydney (AU); Abhinav Kishore, Sydney (AU); Cornelis Jacobus Alant, Sydney (AU); Vijay Suresh Sutrave, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/489,970

(22) Filed: Sep. 30, 2021

(51) Int. Cl.
| | |
|---|---|
| *G06F 40/134* | (2020.01) |
| *G06F 3/0482* | (2013.01) |
| *G06F 9/451* | (2018.01) |
| *G06F 9/445* | (2018.01) |

(52) U.S. Cl.
CPC .......... *G06F 40/134* (2020.01); *G06F 3/0482* (2013.01); *G06F 9/451* (2018.02); *G06F 9/445* (2013.01)

(58) Field of Classification Search
CPC ........ G06F 3/0482; G06F 9/445; G06F 9/451; G06F 40/134
See application file for complete search history.

(56) References Cited

U.S. PATENT DOCUMENTS

| | | | | |
|---|---|---|---|---|
| 7,590,699 | B2 * | 9/2009 | Natarajan | G06F 16/951 709/206 |
| 7,941,798 | B2 * | 5/2011 | Taylor | G06F 8/71 717/170 |
| 8,904,309 | B1 * | 12/2014 | Zhai | G06F 3/0482 715/780 |
| 9,557,913 | B2 * | 1/2017 | Griffin | G06F 3/0237 |
| 10,834,236 | B2 * | 11/2020 | Moore | H04L 67/1097 |
| 2004/0123148 | A1 * | 6/2004 | Offermann | H04L 63/0428 726/5 |
| 2005/0021652 | A1 * | 1/2005 | McCormack | H04L 51/04 709/204 |

(Continued)

*Primary Examiner* — Eric J. Bycer
(74) *Attorney, Agent, or Firm* — Brownstein Hyatt Farber Schreck, LLP

(57) ABSTRACT

The disclosure is directed to systems and techniques for executing a documentation application displaying a graphical user interface having an editable field configured to receive textual input. The system receives a first portion of a textual input in the editable field, which includes a command character designating the first portion of the textual input as a link insertion command. The system receives a second portion of textual input in the editable field and, before entry of the textual input is complete, the system analyzes the second portion of the textual input to identify an external platform service. The system then accesses, using an application programming interface, first hosted data hosted by the external platform service. The first hosted data may be displayed in line with the textual input and used to generate a complete link path. Once complete, the link path is replaced with a selectable graphical object that is operable, when selected, to redirect the user to the external platform service.

20 Claims, 12 Drawing Sheets

(56) References Cited

U.S. PATENT DOCUMENTS

| | | | |
|---|---|---|---|
| 2005/0234883 A1* | 10/2005 | Szeto | G06F 16/90344 |
| 2008/0168366 A1* | 7/2008 | Kocienda | G06F 3/0237 |
| | | | 715/764 |
| 2009/0030984 A1* | 1/2009 | Chen | G06Q 10/107 |
| | | | 709/204 |
| 2009/0077464 A1* | 3/2009 | Goldsmith | G06F 40/129 |
| | | | 715/257 |
| 2011/0289428 A1* | 11/2011 | Yuen | H04L 51/04 |
| | | | 715/752 |
| 2012/0011462 A1* | 1/2012 | Westerman | G06F 3/04886 |
| | | | 715/773 |
| 2012/0029910 A1* | 2/2012 | Medlock | G06F 3/0482 |
| | | | 704/9 |
| 2012/0092278 A1* | 4/2012 | Yamano | G06F 3/04886 |
| | | | 345/173 |
| 2013/0046544 A1* | 2/2013 | Kay | G06F 3/023 |
| | | | 345/169 |
| 2013/0111336 A1* | 5/2013 | Dorman | G06F 9/4843 |
| | | | 715/255 |
| 2013/0212515 A1* | 8/2013 | Eleftheriou | G06F 3/04886 |
| | | | 715/773 |
| 2013/0246329 A1* | 9/2013 | Pasquero | G06N 20/00 |
| | | | 706/52 |
| 2013/0262444 A1* | 10/2013 | Leslie | G06F 16/9038 |
| | | | 707/E17.014 |
| 2014/0002363 A1* | 1/2014 | Griffin | G06F 3/0237 |
| | | | 345/168 |
| 2014/0063067 A1* | 3/2014 | Compton | G06F 3/0237 |
| | | | 345/173 |
| 2016/0224643 A1* | 8/2016 | Robichaud | G06F 11/3452 |
| 2016/0344679 A1* | 11/2016 | Lane | H04L 51/24 |
| 2017/0192993 A1* | 7/2017 | Rakowski | G06F 16/90324 |
| 2017/0262138 A1* | 9/2017 | Van Rotterdam | G06Q 10/109 |

* cited by examiner

FIG. 2B

FIG. 2C https://subdomain.domain.tld/pages/viewpage.action?pageId=0123456   GO

SPACES   PEOPLE   CREATE ...

To contact:
*Do you need more help? Type '/help'*

| CITY | COUNTRY | DEPT. | EMAIL | LAST MODIFIED CODE | NAME | PHONE | STREET | TITLE |
|---|---|---|---|---|---|---|---|---|
| Burlington | USA | Unknown Department | jrogers@burlington.com | 2020-12-11t00-38 | John Rogers | (336)555-1234 | 252 S. Ephemeral St. | VP Facilities |
| Unknown City | Unknown Country | Facilities | smith_john@tophotels.com | 2020-12-11t00-25 | John Smith | (312)555-5678 | 9876 N. Fictional Ave., Suite N Chicago, IL 40601 | VP Facilities |

412, 416, 414, 410

/salesco/contacts/john.table — 422

USER INTERFACE WITH COMMAND-LINE LINK CREATION FOR GENERATING GRAPHICAL OBJECTS LINKED TO THIRD-PARTY CONTENT

FIELD

The described embodiments relate generally to techniques for creating content in a graphical user interface. More particularly, the embodiments relate to systems and techniques for creating selectable graphical objects that link to third-party content. The selectable graphical objects can be created using a command-link interface with dynamic textual suggestion, as described herein.

BACKGROUND

Electronic documents and online content have become ubiquitous resources for product development and professional collaboration. Using an electronic medium, content can be easily shared and published using a variety of techniques. In some cases, it can be useful to link to content created by other teams or sources to reduce redundancy and improve the efficiency of accessing various electronic resources. However, many traditional link creation techniques require the user to type or enter a specific URL path, which can be prone to error if entered manually or, otherwise, requires that the user switch applications to navigate through the specific electronic organizational scheme of the other party's content. Further, traditional hyperlinks, while useful for redirecting a user, may provide sparse information about the content being linked to, requiring the user to select the hyperlink in order to determine the nature of the content. The systems and techniques described herein can be used to create selectable graphical objects quickly and without having to switch applications or views (e.g., context switch), while also reducing overall redundancy and improving computing efficiency by providing active electronic links between different content sources.

SUMMARY

Some example embodiments are directed to a computer-implemented method of rendering remotely hosted data in a graphical user interface. The method may include operations for instantiating a client application on a client device, the client application configured to display the graphical user interface having a content-creation field configured to receive textual input via a keyboard of the client device. A first portion of the textual input may be received in the content-creation field, the first portion of the textual input including a command character designating the first portion of the textual input as a link insertion command. Before entry of the textual input is complete, the first portion of the textual input may be analyzed in order to determine at least a portion of a link path and determine a target content source based on a first portion of the link path. Using an application programming interface, first hosted data hosted by the target content source may be accessed. The first hosted data may include one or more of additional link path data or target content data. At least a portion of the first hosted data may be displayed in line with the textual input of the client application before the entry of the textual input is complete.

In some implementations, a second portion of the textual input is received in the content-creation field. The second portion of the textual input may be analyzed in order to determine an additional portion of the link path. Second hosted data hosted by the target content source may be accessed using the application programming interface and the additional portion of the link path. The first and second portions of the textual input may be replaced with at least a portion of the second hosted data in the content-creation field of the graphical user interface.

In some cases, replacing the first and second portions of the textual input with the at least the portion of the second hosted data comprises creating a selectable graphical object within the content-creation field. The selectable graphical object may include the at least the portion of the second hosted data. When selected, the selectable graphical object may be operable to redirect a user to the target content source.

In some implementations, in accordance with a determination that the second hosted data includes a last path component of the link path, the second hosted data may be analyzed in order to determine if the second hosted data corresponds to a single item or a list of items. In accordance with the second hosted data corresponding to the list of items, a table may be generated in the content-creation field, and the list of items may be inserted into respective cells of the table.

In some cases, in response to receiving the first portion of the textual input, a predicted completion text portion of the first portion of the textual input is displayed. The predicted completion text portion may be displayed to the right of a cursor of the content-creation field. The predicted completion text portion may have a line weight or color that is different than the first portion of the textual input. In response to a user input, the predicted completion text portion may be added to the textual input.

In some implementations, in accordance with a determination that the second hosted data comprises a list of items, the first and second portions of the textual input may be replaced with a link table. The link table may include at the least the portion of the second hosted data. When selected, content displayed in the link table may be operable to redirect a user to the target content source.

In accordance with a determination that the second hosted data comprises a single item, the first and second portions of the textual input may be replaced with a card graphical object. The card graphical object may include at the least the portion of the second hosted data. When selected, the card graphical object may be operable to redirect a user to the target content source.

In response to accessing the second hosted data, the system may cause a display of a floating window object in the graphical user interface. The floating window object may include a set of selectable items, at least one item of the set of selectable items corresponding to the at least the portion of the second hosted data. In response to a selection of an item of the set of selectable items, the system may cause a display of additional text in line with the textual input of the client application. The additional text may correspond to a respective portion of the second hosted data associated with the selected item.

BRIEF DESCRIPTION OF THE DRAWINGS

The disclosure will be readily understood by the following detailed description in conjunction with the accompanying drawings.

FIGS. 2A-2C depict an example graphical user interface used to generate selectable graphical objects.

FIG. 4 depicts another example selectable graphical object.

DETAILED DESCRIPTION

Figure 1:
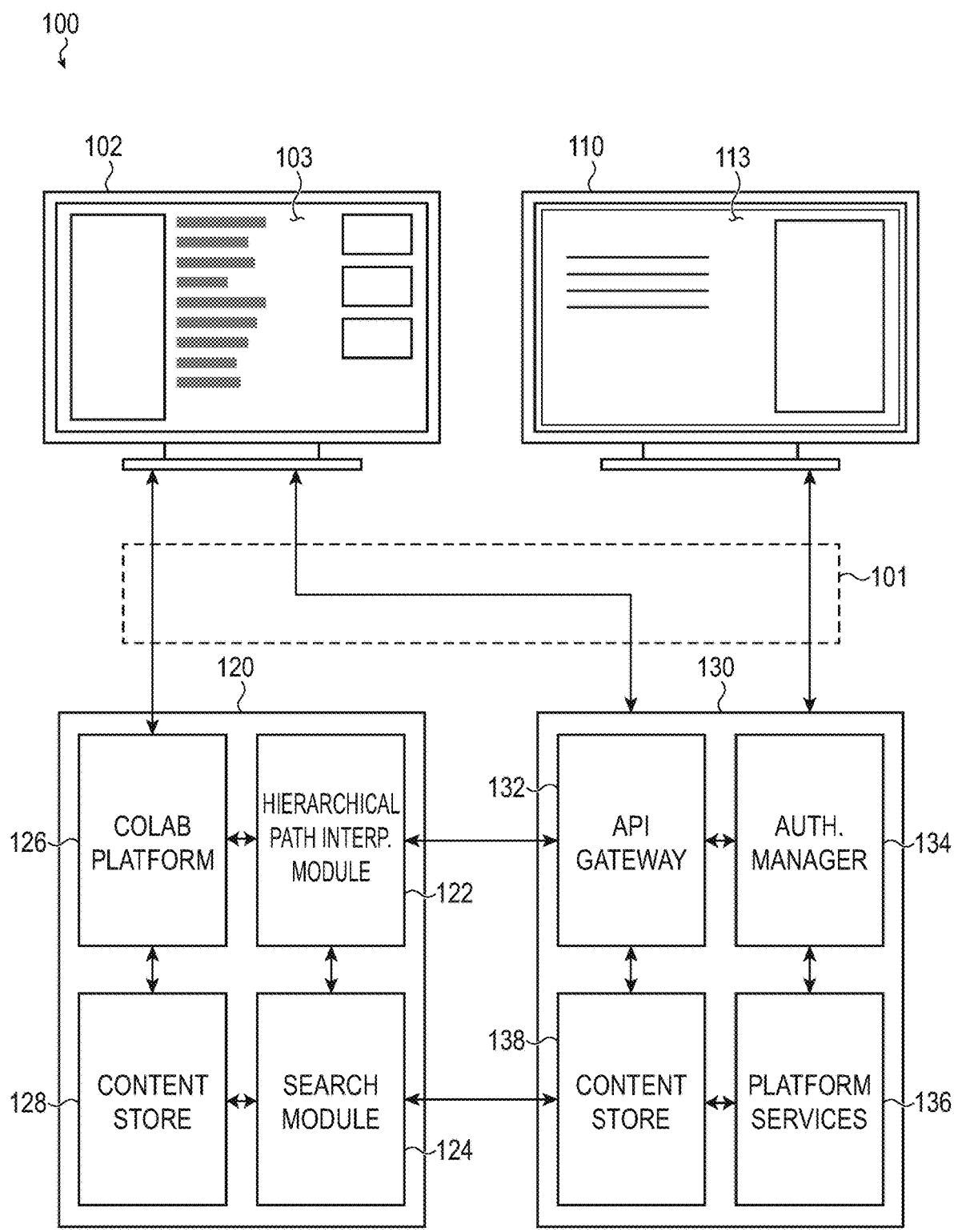
FIG. 1 depicts an example system used for generating selectable graphical objects.

The following description includes illustrations and examples that demonstrate various embodiments of the disclosure. Many of these examples are also illustrated in the accompanying drawings. It should be understood that the following description and examples are not intended to limit the disclosure to one preferred embodiment. Rather, it is intended that the following description covers alternatives, modifications, and equivalents as can be included within the spirit and scope of the disclosure and as defined by the appended claims.

In general, electronic content can be shared or distributed using electronic communication tools that publish or otherwise distribute the electronic content to a group of users. As many content and software providers are transitioning to software as a service (SAAS) platforms, web browsers and web tools can be used to create and share electronic content between teams and various other users. However, sharing content across different platforms or accessing data from other content providers can be cumbersome or difficult. Traditionally, users are required to navigate to a particular webpage or web-hosted content in order to access or view third-party content. In order to facilitate more rapid access to third-party content, users may type or enter a URL into their own content, which may be used to create a traditional hyperlink. However, some current hyperlink creation techniques require that the user access multiple web interfaces or screens, which consumes additional computing resources and may require a complex set of interface selections and interactions, which may lead to error and inoperable or inaccurate hyperlinks. Furthermore, once links are established, some traditional hyperlinks appear as lengthy URL paths or other text that may be indecipherable to the user or provide little information about the target content being linked.

The embodiments described herein can be used to facilitate creation of selectable graphical objects that can be inserted into the user's content without having to switch applications, browser tabs, or screens, in order to create the desired link. Furthermore, the selectable graphical objects may be created using data extracted from the target content, which may give the user a more clear indication of the content being linked. For purposes of the following description, selectable graphical objects may include selectable tiles, buttons, or other similar graphical objects that include metadata or other data extracted from the target content. As described herein, selectable graphical objects may include a graphic or logo that corresponds to the remotely hosted content as well as curated content obtained from the linked content. In some cases, the selectable graphical object is depicted as a contact card having the name and contact information for a particular person or organization, as stored at the linked content host. In other cases, the selectable graphical object is depicted as a table of contacts or organizations, as stored at the linked content host.

Various techniques for creating selectable links are described herein. In a first set of embodiments, a selectable link or linked content may be generated in response to an in-line command that is inserted in a field or region of a graphical user interface. In some instances, the in-line command is entered into an editor or other text entry region of the interface. In response to entry of the in-line command, a series of automated queries may be made to a remote target content source or remotely hosted content. The automated queries may include application programming interface (API) calls to the remote host and return content data and/or organizational schema regarding the structure of data available at the remote host. As the user enters a partial path or additional information associated with the desired link, the system may present one or more selectable options that correspond to data retrieved using the API calls. Through a series of graphical and/or textual suggestions, the system guides the user through the creation of a complete path to the desired target or end path object that is used to generate the link. Once the path is complete, the system may also prompt the user for a selection regarding the format or type of selectable object, which may include a contact card, selectable table, or other embedded content link.

The prompts or selections may be provided using one of a number of different techniques, as described herein. For example, a series of API calls may be used to retrieve data from the hosted content, which may be presented in one of a series of selectable regions presented in a floating window or other similar graphical element. The retrieved data may also be used to display suggested partial path text that is displayed in a lightened font or other visually distinguishable format, in line with the user's textual entry. In some cases, a selection of or hover over a selectable region of the floating window results in the display of partial path text, which may be accepted through additional typing or selection by the user.

In accordance with some embodiments described herein, one or more API calls may be used to retrieve data from the hosted content in order to create a selectable object within the user's content. Based on an analysis of the retrieved data, the system may present either a single selectable card object or a table of objects, depending on whether the retrieved data corresponds to a single entity or corresponds to a list or group of entities. As described in more detail here, if the link relates to a contact or entity information, the system may present a single selectable contact card or other graphical object if the retrieved data corresponds to a single entity and may create and present a table of contacts if the link relates to a set or group of entities or contacts.

These and other embodiments are discussed below with reference to FIGS. 1-9. However, those skilled in the art will readily appreciate that the detailed description given herein with respect to these Figures is for explanatory purposes only and should not be construed as limiting.

FIG. 1 depicts an example system 100 for creating selectable graphical objects that link to external content. The system 100 may be used to quickly access third-party content or, in some cases, contact information or entity information from a customer relationship management (CRM) system. In particular, systems and methods described herein with respect to system 100 and other examples relate to methods for translating application programming interface (API) calls to third-party CRM API endpoints for structured data into a natural language, hierarchical path structure.

As a result of the architectures and methods described herein, a user of a first-party software platform, such as a service desk platform or a documentation tool, can more quickly access specific customer, client, or vendor data regardless of the context in which a need for such data arises. As depicted in FIG. 1, the system 100 may include a client device 102 executing a client application that is configured to generate and display a graphical user interface 103. Using the techniques and systems described herein, accurate link creation may be performed from within the graphical user interface 103 of the client application without requiring the user to toggle or switch between applications, tabs, or screens.

As described herein, the graphical user interface 103 provided by the client application instantiated on the client device 102 may include an editable field that is provided by a document editor, collaboration tool, or other content creation platform. The client application may be provided by a Web browser, dedicated application, or other similar software application that is configured to access content and develop new content for one or more collaboration platforms 126 provided by the hosted platform services 120. As described herein, the client application may be configured to access the content store 128 of the hosted platform services 120 in order to provide the functionality related to one or more of the collaboration platforms 126 supported by the hosted platform services 120. The collaboration platforms 126 may include a documentation platform or content creation platform configured to allow for enterprise-wide content creation (e.g., Confluence™ from Atlassian™), an issue tracking platform configured to create and monitor tasks, issues, or tickets (e.g., Jira™ from Atlassian™), or other collaboration or productivity-focused platforms.

The hosted platform services 120 may also include a hierarchical path interpreter module 122 (also referred to herein as a dynamic link creation module, hierarchical path interpreter, or path interpreter module) that is configured to assist the user, through the graphical user interface 103 of the client device, in the creation of selectable graphical objects without leaving the context of the client application. As described herein, the hierarchical path interpreter module 122 is able to monitor text or command line input from the user (input via the graphical user interface) and interpret partial path or partial command input in order to formulate API calls to an API module 132 of an external platform services 130 in order to assist and guide the user in completion of the link or path.

As described herein, the hierarchical path interpreter module 122 is configured to receive and analyze partial text entries as the user types them into an editable field or region of the graphical user interface 103. The analysis performed by the link creation module may occur in response to the entry of a command-line character or symbol (also referred to herein as a command character) that designates the textual input as a link insertion command. In some cases, the command-line character, such as a forward slash "/" or a forward slash with one or more designated characters "/L", may be interpreted by the system as a link insertion command. In response to determining that a link insertion command has been entered, the link creation module may begin to analyze partial textual entries as the user enters the textual input. The hierarchical path interpreter module 122 may perform textual analysis on the partial textual entries in order to identify a target content source. In the example of FIG. 1, the target content source may be associated with a hosted service 136 offered by the external platform services 130. In some cases, the hosted service 136 may also be accessible by a URL or other address or path.

In response to identifying the target content source, the hierarchical path interpreter module 122 may formulate one or more API requests to the API gateway 132 of the external platform services 130. The API requests may be specific to the external platform services 130 and, in some implementations, may be determined by the link insertion command, which may indicate a class of target sources to be accessed, which may correlate to a particular API schema or set of predetermined APIs. The API may be formulated in accordance with a Representational State Transfer (REST) or RESTful API that can be implemented using a web-enabled schema like JavaScript™ Object Notation (JSON) or other schema. In some cases, the API has a specific query schema in accordance with one or more standards including GraphQL™, Apollo™, Oracle™ PL/SQL™, or other schema. The API calls generated by the hierarchical path interpreter module 122 may be serviced by the API gateway 132 of the external platform services 130. The API calls may include partial path information, one or more search terms, or other structured or unstructured data that may be used to access data on the external platform services 130.

The API gateway 132 may utilize a number of modules and services hosted by the external platform services 130 in order to respond to calls made by the hierarchical path interpreter module 122. In some cases, the API gateway 132 may authenticate the user and/or the request using the authorization manager 134. In some cases, the API calls include user account information received from the client device 102 that is used by the authorization manager 134 to authenticate the user and allow access to the content store 138 and/or the hosted services 136. The authorization manager 134 may issue a token or other authentication credential that can be used by the hierarchical path interpreter module 122 to access data and services on the external platform services 130. In some implementations, all data and service requests are routed through the authorization manager 134 to ensure that the API calls are originated from an authenticated source.

In many cases, the user of the client device 102 may need to create an account or register with the external platform services 130 in advance of the link creation operations described herein. In some instances, the client device 102 utilizes a multi-factor authentication as defined by or in accordance with security protocols defined by the external platform services 130. The authentication may also be performed as part of a single-sign on (SSO) or other broadly implemented security protocol, which may be used to authenticate the user of the client device 102 in advance of the link creation operations.

The data and services that are provided by the external platform services may be restricted to users having a registered account (authenticated using one of the techniques described above) and having an appropriate set of permissions, which may be defined by the type of registered account or user-specific access protocols. Generally, for purposes of the following examples, the user may have at least "view" or "read" permission for content displayed or accessible using the link creation tools described herein. Users without an account and/or without the appropriate set of permissions may not be able to use the link-creation techniques to access data that would otherwise be restricted from viewing by that user. Additionally, there may be portions of the content and/or services provided by the external platform services 130 that are available to the public and do not require authentication or a special set of permissions in order to access or view.

With respect to FIG. 1, in response to one or more of the API calls made through the API gateway 132, the hierarchical path interpreter module 122 may receive host data. The host data may be interpreted by the link creation module in order to generate one or more visual prompts that are displayed in the graphical user interface 103 in order to prompt or suggest additional input from the user. In some cases, the visual prompts include in-line text that is displayed ahead of the cursor position of the graphical user interface, which may suggest to the user a predicted completion of a portion of the link which, in some cases, may include a completion of the link or a final target. In some cases, the visual prompts include a series of selectable options that are presented in a floating window or other graphical element in the graphical user interface 103. In response to the prompts, the user may enter additional textual input either through a keyboard or by selecting one of the visual prompts. This process of interpreting a partial input, calling the external platform services 130 using one or more API calls and displaying prompts, may be repeated multiple times until the complete link path or final target is specified in the command line.

As described herein, once a target is specified, the system may use the retrieved hosted data to create a selectable graphical object that replaces the textual input. The hosted data, obtained using an application program interface, may include additional link path data or target content data, which may be used to complete the link path of the textual input. The selectable graphical object may include a card or tile that includes information identifying the target content source and may include key information obtained from the hosted data. In accordance with the examples provided herein, the link may include a contact name, contact phone number, email address, or other similar information associated with a contact stored in the content store 138 of the external platform services 130. Also as described herein, if the hosted data corresponds to multiple items or entries, the selectable graphical object may be presented as a table of items having hosted data displayed in appropriate cells of the table. If the target corresponds to a multimedia item or other similar content, the selectable graphical object may include an embedded link that includes an image, graphic, GIF, or other content that is displayed within the selectable graphical object.

The hierarchical path interpreter module 122 may also be adapted to interpret a portion of the path text as a format or display command associated with a particular format. For example, a format command may be designated through a "." ";" ":" or other symbol that can be used to delineate an in-line formatting command. The format or display command may be used to designate whether the hosted data is presented as a card, phone number, name, or other single line format. The format or display command may also specify a table display format, embedded media display format, or other type of format as can be specified by the user. In some cases, the hierarchical path interpreter module 122 automatically detects or determines a type of hosted data and constructs a default format or display command as part of the complete path or line command.

As depicted in FIG. 1, the content available through the external platform services 130 may also be provided through a separate graphical user interface 113 provided by a client application instantiated or executing on the client device 110. In this example, the separate graphical user interface 113 is depicted as being executed on a separate client device for purposes of illustration. However, the graphical user interface 113 may also be executed on the same client device 102, which is providing the other graphical user interface 103. The two graphical user interfaces 110, 113 may be provided by two separate applications or may be provided in different tabs of a shared application, like a browser or other similar application.

The techniques described herein allow the user access and search content that may otherwise be available using the separate graphical user interface 113, but without having to leave the graphical user interface 110. As discussed above, these techniques may allow the user to find, view, and insert content related to third-party content without having to leave a current UI or context, which improves the speed of content creation and improves computing efficiency by reducing the number of user interfaces that need to be generated and may reduce the amount of data that is transmitted over a network in order to find content and create a link or selectable graphical object within the content.

As shown in FIG. 1, the system 100 includes external platform services 130 that is adapted to provide content for third-party services and content. The content may be rendered, viewed, and otherwise accessible through the graphical user interface 113. The external platform services 130 includes an authorization manager 134, which is adapted to authenticate users and transactions in order to maintain secure storage and access to the platform services 136 and the associated content store 138. The authorization manager 134 is adapted to authenticate users either through entry of credentials (e.g., a username and password) through the graphical user interface 113 or through a secure token or other similar credential. Token authorization or other similar authorization techniques may be used by the hierarchical path interpreter module 122 and/or the search module 124 in order to access data stored by the content store 138 and/or services provided by the hosted platform services 136.

As described above, the hierarchical path interpreter module 122 and/or the search module 124 may be able to access data and services from the external platform services 130 using a series of API calls, which may be defined by the external platform services 130. In some cases, the external platform services 130 provides a host of REST API or other API resources that enable searching and retrieval of data stored in the content store 138. As an example, the API gateway 132 may be adapted to service query resources that return a single result, a set of results, path information, partial path information, and/or information about the organizational structure of the data accessible on the content store 138. The search module 124, similar to the hierarchical path interpreter module 122, may be able to query the external platform services 130 in order to present remotely hosted data and/or selection options to a user of the client device 102 without navigating away from the graphical user interface 103.

The external platform services 130 may, in some cases, provide a customer-resource management (CRM) system that is adapted to manage and store sales leads, sales contacts, contact information, customer directories, workflow information, and other data associated with the CRM system. An example CRM system may be Salesforce.com™, Monday.com™, Insightly.com™, and other customer-resource or relationship management tools. A typical CRM may enable a sales team to track engagements with key customers or contacts and manage a sales pipeline, develop marketing analytics, and provide other services for a sales or marketing team. While a CRM is used as an example throughout the specification, similar or the same techniques may be applied to a wide range of other systems and platforms. Furthermore, while some of the examples described herein rely on the use of third-party APIs, other implementations may use other techniques to access metadata or other information retrievable via a URL or other network-addressable locations.

FIG. 1 depicts an example system 100 having multiple computing devices operably coupled by a computer network 101. As shown in FIG. 1, the system includes client devices 102 and 110. The client devices 102, 110 can be any suitable electronic device; examples include a desktop or laptop computing device. In other examples, the client devices 102, 110 may be a mobile device such as a tablet or a cellular phone. It may be appreciated that these example electronic devices are not exhaustive; any suitable device may be a client device as described herein.

The client devices 102, 110 may each include a processor and a memory. The processor may be any suitable computing device or logical circuit configured to execute one or more instructions to perform or coordinate one or more operations on or to digital data. In many embodiments, the processor or processors of the client devices 102, 110 may be a physical processor, although this is not required of all embodiments; virtual components may be suitable in some implementations. Similarly, a memory of the client device 100 may be configured and/or implemented in a number of suitable ways and may be partially or completely virtualized.

In typical examples, the processor of the client devices 102, 110 is configured to access at least one executable asset from the memory of the client devices 102, 110. More particularly, the processor of the client devices 102, 110 may be configured to access a data store portion of the memory to load, into a working portion of the memory, at least one executable asset or executable program instruction. In response to loading the instruction or executable asset into working memory, the processor of the client devices 102, 110 may instantiate an instance of software referred to herein as a client application.

In many embodiments, a client application (also referred to as a "frontend") may be configured to provide client-side functionality of a software platform (a documentation or content creation service or other collaboration platform). More specifically, the client application may be configured to communicably couple to a separate instance of software executing on, and/or instantiated by, a host system or server configured to provide server-side ("backend") functionality of the hosted platform services 120 (e.g., documentation or content creation service). In this manner, a documentation or content creation service is defined in part by a frontend executing/instantiated on a client device and in part by a backend executing/instantiated on a host server of the hosted platform services 120 in communication with the frontend.

In this example, the hosted platform services 120 and external platform services 130 include a host server supporting the backend configured to operate within, or as, a virtual computing environment that is supported by one or more physical servers including one or more hardware resources such as, but not limited to (or requiring) one or more of: a processor allocation; a memory allocation (also referred to as a working memory); non-volatile storage (also referred to as persistent memory); networking connections; and the like.

Further, it may be appreciated that although referred to as a singular "server", a host server supporting the backend may be a cluster of different computing resources, which may be geographically separated from one another. In this manner, because specific implementations may vary, both the host server (of the hosted platform services 120 and external platform services 130) and the client device 102 can be referred to, simply, as "computing resources" configured to execute purpose-configured software (e.g., the frontend and the backend).

As used herein, the general term "computing resource" (along with other similar terms and phrases, including, but not limited to, "computing device" and "computing network") may be used to refer to any physical and/or virtual electronic device or machine component, or set or group of interconnected and/or communicably coupled physical and/ or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

An example implementation of the system of FIG. 1 is described below with respect to FIGS. 2A-9. While the following screen shots and examples are provided as an illustration of the principles of this disclosure, the examples are not intended to be limiting in nature and merely serve to demonstrate the use of the proposed systems and techniques.

In one example use of the system 100, a customer service agent providing software support to customers may receive a telephone call from an unknown number, from a caller who begins describing a problem the moment the call connects. In order to provide service to the caller, the agent must first identify who the caller is, what software the caller is operating, whether the caller is a VIP, whether the caller should be elevated to a supervisor, what software issue the caller is facing, whether the software issue signals a service level agreement (SLA) compliance problem, and so on. Obtaining, memorializing, and acting on this information (e.g., by searching a CRM) may be particularly challenging while the customer service agent simultaneously devotes attention to listening to the caller.

In this example, as may be appreciated by a person of skill in the art, time is of the essence and the responsiveness with which the agent can address and/or triage the caller's reason for calling directly impacts business reputation, SLA compliance, customer satisfaction, and so on. To address these and other issues, the system 100 of FIG. 1 and other examples described herein may be directed to a simple text-based user interface that can be used from within any editable field of a service desk application: (1) search through, and select, a third-party or first-party CRM API endpoint; (2) search through and select one or more data transformations that may be applied to structured data returned from the selected third-party API endpoint; and/or (3) search through and select one or more formats or display options for rendering or presenting the (optionally, transformed) structured data.

Embodiments described herein resolve these and other problems by providing an abstraction layer, also referred to as a hierarchical path interpreter 122, over CRM API calls. More specifically, the hierarchical path interpreter 122 can be configured to receive, as input, plain text entered by a user/agent into any editable field of any suitable user interface, such as a user interface of a service desk application, and can be configured to provide as output a specifically-formatted API call, along with any suitable authentication and/or authorization tokens, to a CRM system to obtain the requested data without requiring a customer service agent to context switch into the CRM system at all. As discussed previously, these embodiments allow for a customer service agent to search through a CRM for desired or necessary data from within the familiar environment of the agent's service desk application.

For example, when operating a service desk or documentation application (example graphical user interface 103), a customer service agent may receive a call from an unknown caller who quickly identifies him or herself and begins describing an issue the caller is facing. In a conventional system, the agent may be required to load a CRM, represented by graphical user interface 113. The loading of the CRM may require authentication and/or authorization before access is permitted, taking valuable time, which may be exacerbated if multi-factor authentication is required. The user would then need to manually search the CRM to find any relevant information relating to this particular caller/customer and/or associated accounts or software licenses. In many cases, the operations of loading the CRM, accessing content in the CRM, and so on consume valuable time and attention of the agent; the agent may miss critical information while concentrating on using the CRM system.

By contrast, for embodiments described herein, when operating the service desk application, the customer service agent may leverage a hierarchical path language defined by (or implemented by) a hierarchical path interpreter 122, such as described herein, to search the CRM for particular data. For example, the agent may type into an editable field of the service desk application "CRM/SOFTWARE/TENANT/USERS/JOHN" after hearing the caller identify himself as "John." This, in turn, can be received as input to the hierarchical path interpreter 122 which can generate an appropriate API call to the API gateway 132 of the CRM system (external platform services 130) to query all USERS of TENANT of SOFTWARE with a name that includes John. In response, an overlay can be rendered in the graphical user interface 103 of the service desk application to show a list of all persons with a name that includes "John," alongside other relevant information (e.g., account number, license number, SLAs, most recent call, number of recent calls, number of outstanding issues, lifetime number of issues, and so on), thereby providing the agent with immediate helpful context for the call. Once more information is obtained by the agent, the list can be narrowed to a specific user.

In another example, when operating the service desk or documentation application (graphical user interface 103), the customer service agent may leverage a hierarchical path language defined by or implemented by a hierarchical path interpreter, such as described herein, to obtain information about a caller based on the caller's telephone number. For example, the agent may type into an editable field of the service desk application "CRM/TEL/555123456" based on the caller ID shown to the agent. In response, the hierarchical path interpreter 122 can generate an appropriate API call to the API gateway 132 of the CRM system to query all USERS of all TENANTs of all SOFTWARE/PLATFORMS with a telephone number that includes 555123456. In other cases, the agent may type into an editable field of the service desk application "CRM/TEL/3456" based on the trailing portion of the caller ID shown to the agent. In response, the hierarchical path interpreter 122 can generate an appropriate API call to the API gateway 132 of the CRM system to query all USERS of all TENANTs of all SOFTWARE/PLATFORMS with a telephone number that includes 3456. In other cases, the agent may type into an editable field of the service desk application "CRM/SOFTWARE/USERS/TEL/3456" based on hearing from the caller the software name and based on the trailing portion of the caller ID shown to the agent. In response, the hierarchical path interpreter 122 can generate an appropriate API call to the CRM system to query all USERS of all TENANTs of the SOFTWARE with a telephone number that includes 3456.

In these embodiments, the hierarchical path interpreter 122 can operate according to an implementation-specific configuration schema that may vary from embodiment to embodiment. The configuration schema can be used to associate particular path parts to particular API calls or particular sequences of API calls.

In addition, for embodiments described herein, a hierarchical path interpreter 122 may be configured to defined one or more paths or path parts that are specific to a particular organization's (or team's) internal vocabularies, semantics, and taxonomies.

FIGS. 2A-9 depict example graphical user interface elements and a process flow that may be implemented using the system 100 described above with respect to FIG. 1. As discussed previously, the following examples are provided with respect to an example interface with a CRM system. However, a similar or the same approach can be applied to a variety of other types of systems including cloud-based document management systems (e.g., Google Docs™), issue tracking systems (e.g., Jira™ or Trello™), and other remotely hosted services and platforms.

Figure 2A:
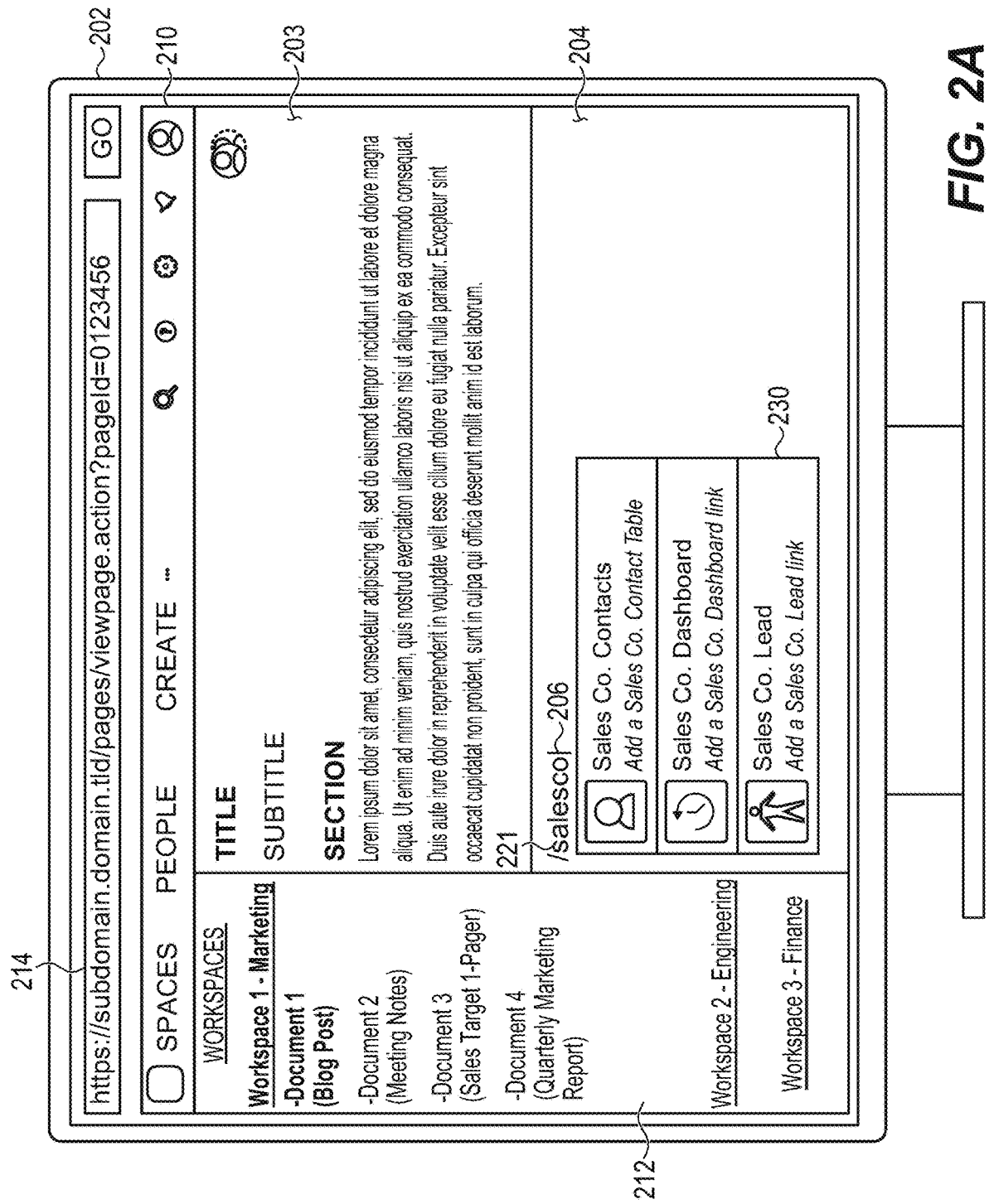
Figure 2B:
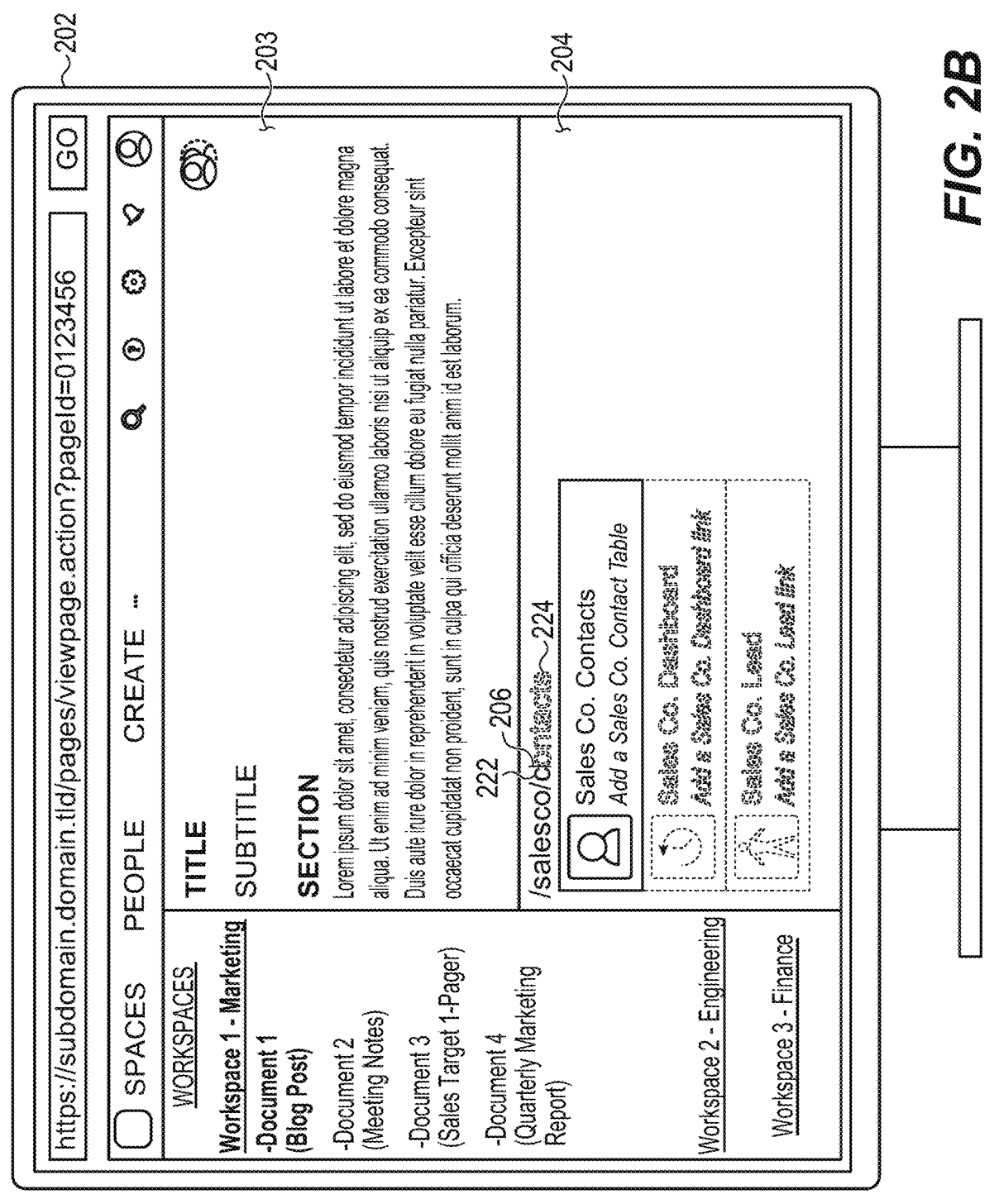
Figure 2C:
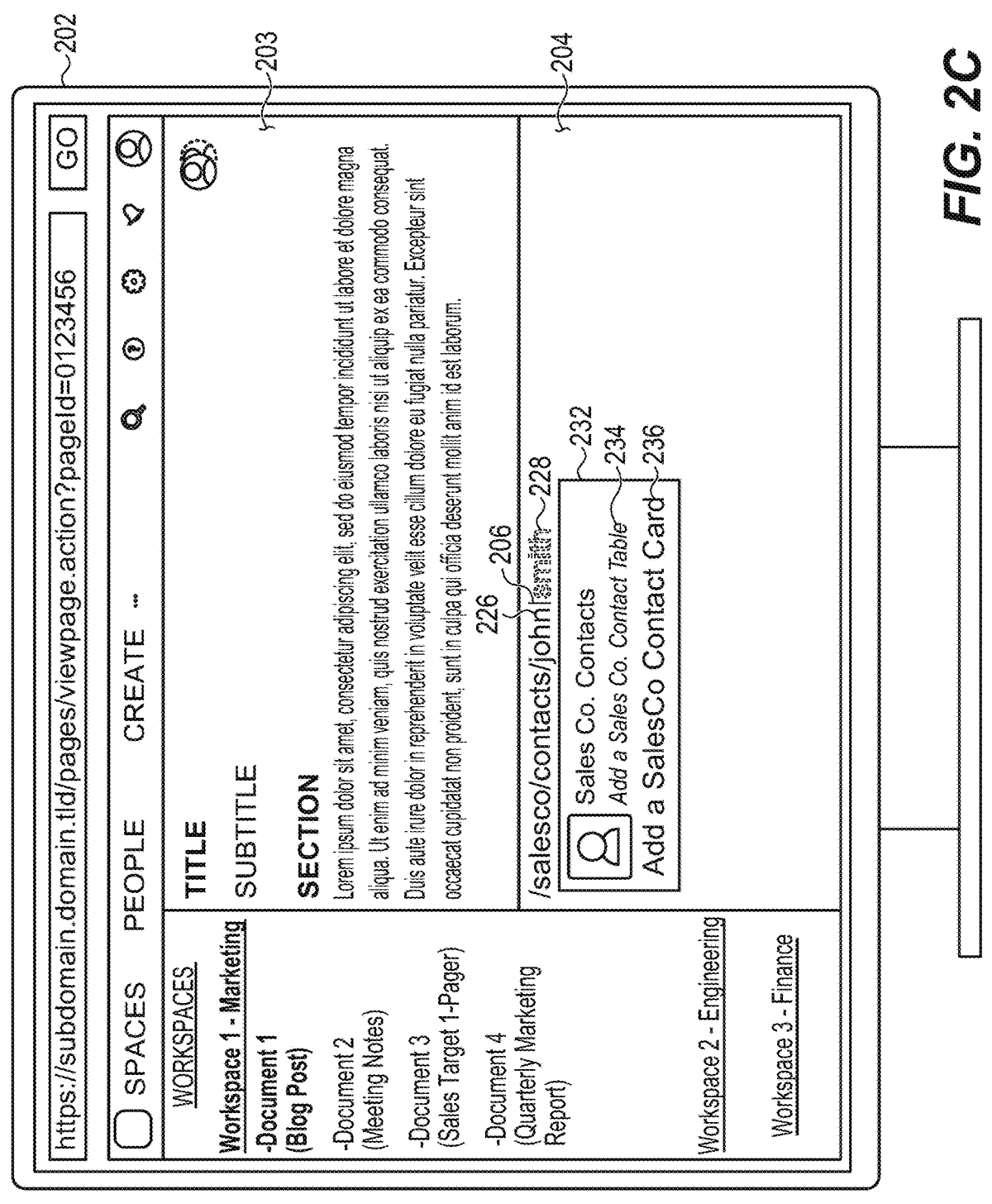

FIGS. 2A-2C depict an example graphical user interface including an editable field in which a link-creation command may be initiated. The graphical user interface 203 of FIGS. 2A-2C may be associated with a documentation or content creation platform. The application of the following techniques and examples is not limited to this specific context and can be applied to a broad range of client application types having editable fields or other regions that are configured to receive text input. In this example, the graphical user interface 203 includes editable field 204. The editable field 204 may also be referred to herein as a content-creation field or user-editable region. Using a keyboard, touch screen, mouse, keypad, or any other user input device of client device 202, the user can enter text, at a cursor position 206 displayed on the graphical user interface 203.

The graphical user interface 203 may include a variety of different fields and graphical objects that can be used to navigate user-generated content or other data provided by the platform. In this example, the graphical user interface 203 includes a title bar 210 that includes a series of selectable options that may provide pull-down or pop-up menus containing a list or set of selectable items that is associated with a particular topic or grouping of functionality. The graphical user interface 203 also includes a navigational region 212, which may be used to navigate to other documents, other document spaces or workspaces, or access other content provided by the platform services. In this example, the client application is a browser and also includes an address field 214, which may display a URL or other path information associated with the content displayed in the graphical user interface 203. The current example depicts a client device 204, which may be a desktop or workstation device. However, a similar or the same graphical user interface 203 may be displayed using a mobile phone, smart phone, tablet, or other computing device having or operably coupled with a display.

As shown in FIG. 2A, the user has entered a first portion 221 of a textual input in the editable content-creation field 204 of the graphical user interface 203. In this example, the first portion of the textual input includes a command character ("/"), which may be used to designate the first portion of the textual input as a link-insertion command. Additional command characters may include, without limitation, "@," "\\," ">," or other characters alone or in combination with additional characters. For purposes of this disclosure, the term "character" may be used to refer to alpha-numeric characters, symbols, glyphs, and other elements that may be provided using a user-input device like a keyboard, touch screen, or other similar device. In some cases, the command character may be inserted using a drop-down or other menu provided by the graphical user interface 203 and is not necessarily "typed" or directly entered by the user.

In FIG. 2A the first portion of the textual input also includes a string or portion of text that designates a target content source or external platform services. Specifically, the first portion of the textual input designates a source "salesco," which may specify a specific CRM or other external platform service. One example CRM may be Salesforce.com™, which provides information about sales contacts, marketing analytics, sales pipelines, and other information that may be needed to be referenced by the user. In accordance with the previous examples, the first portion of the textual input may be analyzed by the platform services (e.g., the hierarchical path interpreter module 122 of FIG. 1) in order to identify a target content source or external platform service. In some cases, the textual input may correspond to a portion of a URL but it is not necessary that the text correspond as the hierarchical path interpreter may recognize a set of specified commands, which are mapped to a particular URL or API gateway having a similar or different name.

In accordance with some embodiments, a set of API commands or tools is selected in response to analyzing the first portion of the textual input. The API commands may be selected in accordance with API commands supported by an external platform service. The API commands may allow the user to indirectly query, search, extract, or analyze data that is provided by the external platform service, without leaving the context of the graphical user interface 203.

As depicted in FIG. 2A, in response to the entry of the command character, the system may cause a display of a floating window 230 that includes selectable options, each option associated with a different target content source, external platform service, or subtopic or service associated with a content source. The floating window 230 may also be referred to as a floating window object and may overlay or overlap other content or graphical elements of the graphical user interface 203. Through the use of the floating window 230, the graphical user interface 203 may guide the user through a set of options that has been selected in accordance with the portion of the textual input, as the user is typing. This can be used to help the user complete the command by presenting options that are appropriate given the partial input provided. As demonstrated in the series of examples of FIGS. 2A-2C, the list of selectable options displayed in the floating window 230 change as the user enters additional text of the command line.

The target content source or external platform service may host a number of different accounts that are registered with respect to the platform services. As discussed above, access to the platform services and/or the content store may be restricted to users having a registered account and having a set of permissions that allows at least read access to the respective services and data provided by the external platform service. Accordingly, the user may be authenticated before data and/or services are accessible using the hierarchical path interpreter module. In some cases, the use is authenticated in response to the system recognizing or receiving the link insertion command (e.g., entry of the command "/salesco"), as depicted in FIG. 2A. Alternatively, the user may be authenticated before the link insertion command is entered. For example, the client device and/or hosted platform services may be issued a token or other authentication credential created in response to a user authentication protocol that is performed prior to entry of the link insertion command. Authorization protocols may include a multi-factor authentication scheme as defined by the external platform service or in accordance with a single-sign on (SSO) protocol.

FIGS. 2B and 2C depict the graphical user interface as further link or textual input is provided. In the following examples, different portions of the textual input may be characterized as "second," "third," or "additional" portions, which may be used to refer to a specific entry of text in a specific example. One of ordinary skill should recognize that the modifiers "first," "second," and the like are relative in nature and the same portion of text in different examples may be a second, third, or additional portion depending on the context of the particular example being provided and may not be appropriate for all possible implementations. For example, a "second portion" of text in one example may serve as a "third portion" of text in another example.

In FIG. 2B, the user has entered a second portion or additional text 222 after designating "salesco" as the desired external platform service. In this example, the additional text 222 is set off from the base link insertion command by a forward slash. However, in other cases, a different character may be used to set off the additional text or there may be no character separating the first and second portions of the textual input.

In response to the entry of additional text 222 (and while the user continues to enter text or before the entry of text is complete), the system may analyze the additional text 222 and determine additional path information associated with the external platform services. In some cases, the system may use the additional text 222 to construct an API request that is serviced by the API gateway of the external platform services in order to obtain hosted data (e.g., hosted content or additional path link data) associated with the partial path or text entered, so far. Alternatively, the system (using the hierarchical path interpreter) may select from a list of pre-stored or cached options that are associated with a particular external platform service, without having to construct an API call to obtain hosted data. The pre-stored or cached options may be stored using resources of the hosted platform services and/or the client device. The hosted data may include additional link path data or target content data, which may be used to complete the link path of the textual input.

As demonstrated by this example, the analysis of the link path may be dynamic in nature so as to provide useful information to the user, as the user continues to enter or has recently finished entering the link path. Analysis of a partial or full link path may be triggered in response to one or more criterion triggered by an amount of text entered, an amount of elapsed time, or other relevant event. For example, an analysis of the link path and generation of an API request may be triggered in response to a threshold number of characters being entered. The analysis and API request may also be performed in response to both a threshold amount of text being entered and a timing criterion being satisfied. For example, the threshold represents a minimum amount of new text that must be entered before a new API request is generated. In addition, the timing criterion may specify a minimum time to elapse between API requests to avoid the generation of too many API requests being generated too quickly, which may cause performance issues for the external platform service. In some cases, the timing criterion is dynamically adjusted in response to a measure of latency between API requests being sent and results being provided by the external platform service.

Because the user may be granted a set of permissions with respect to only a portion of the data and/or services provided by the external platform services, responses to API requests or additional path information may be determined in accordance with the set of permissions provided for the particular user. For example, the user may need to be granted at least "read" or "view" permissions for data and services that are displayed or suggested to the user through the described technique. In some cases, the user may view options that are associated with restricted data or restricted services but cannot select or access the underlying data without having an appropriate set of permissions allowing at least "view" or "read" permissions.

As shown in FIG. 2B, the selectable options displayed in the floating window 230 have changed in accordance with the entry of the additional text 222. Specifically, the entry of the additional letter "c" may be interpreted as an indication that the link will be related to "contacts" associated with a particular service offered by the external platform service "Salesco." As shown in FIG. 2B, while only the relevant selection associated with contacts is selectable, the additional, previously selectable options may continue to be displayed, indicating to the user that available options may be available if entry of the additional text 222 is deleted or revised. This helps guide the user through the creation of the path text without having to change context or even remove hands from the keyboard or other input device in order to navigate potential options.

As also shown in FIG. 2B, in line with the text but to the right of the cursor 206, the system may cause the display of additional path information or a predicted completion text portion 224 that is predicted to be relevant to the additional text 222. The predicted completion text portion 224 may be determined based on additional link path data (example hosted data) obtained from the external platform services. Here, the remainder of the word "contacts" (specifically, the text "ontacts") is displayed in a font having a different color (e.g., reduced darkness) or line weight, indicating the predicted completion of the text being entered by the user. In some cases, the predicted completion text portion 224 may be highlighted, displayed in a different color value or hue, or otherwise be displayed with a visually distinct format with respect to the portion or portions of text entered by the user (to the left of the cursor 206). The additional text or predicted completion text portion 224 that is displayed to the right of the cursor 206 may dynamically change in accordance with further characters or text entered by the user. In some cases, the predicted completion text portion 224 may be selected by the user using a mouse, touch screen, or other similar input. In some cases, the predicted completion text portion 224 may be selected by the user using the tab key, space bar, a directional arrow key, or other designated key of the keyboard or input device.

FIG. 2C depicts the textual input after the user has entered a third portion or additional text 226. In response to the entry of the additional text 226, the system using, for example, a hierarchical path interpreter module, may analyze the additional text 226 and determine or construct an API call or request to the target content source or external platform service, which may be serviced by a respective API gateway. In response to the API call, the system may receive hosted data that corresponds to data accessible at a location that corresponds to the path or partial path information entered by the user. In this example, the additional text 226 is a first name "John" and the system may formulate an API call to query the Salesco platform for contacts having the first name John. In response, the system may receive, from the external platform service, hosted data that includes search results for the query performed as a result of the API call. Because the hosted data is directed to one or more items or contacts (rather than additional link path data), the hosted data may be classified or referred to as target content data. All or some of the hosted data may be displayed to the user before the entry of the textual input is complete. For example, if a majority or a representative amount of hosted data corresponds to the name "John Smith" the last name "smith" may be displayed in-line with the entered text. In accordance with the previous example, the precited completion text 228 may be displayed in a ghosted, lighter, or otherwise visually distinct font to the right of the cursor 206, thereby suggesting to the user a predicted completion of the text entry.

In response to determining that the textual input includes a last path component, the system may complete the link path and create a selectable graphical object or selectable link. In the example of FIG. 2C, a floating window 232 is displayed that provides one or more selectable options for displaying the data retrieved from the external platform service. Specifically, the user may select a first option 234 corresponding to a display of a contact table and a second option 236 corresponding to a display of a contact card. In some cases, the display or formatting options are displayed in response to an additional selection of the floating window 232 or other element of the graphical user interface 203. In accordance with some embodiments, the formatting options may also be designated by the user through the entry of a format or display command designated by a special symbol (e.g., a period "." semicolon ";" colon ":" or other type of symbol).

Figure 3:
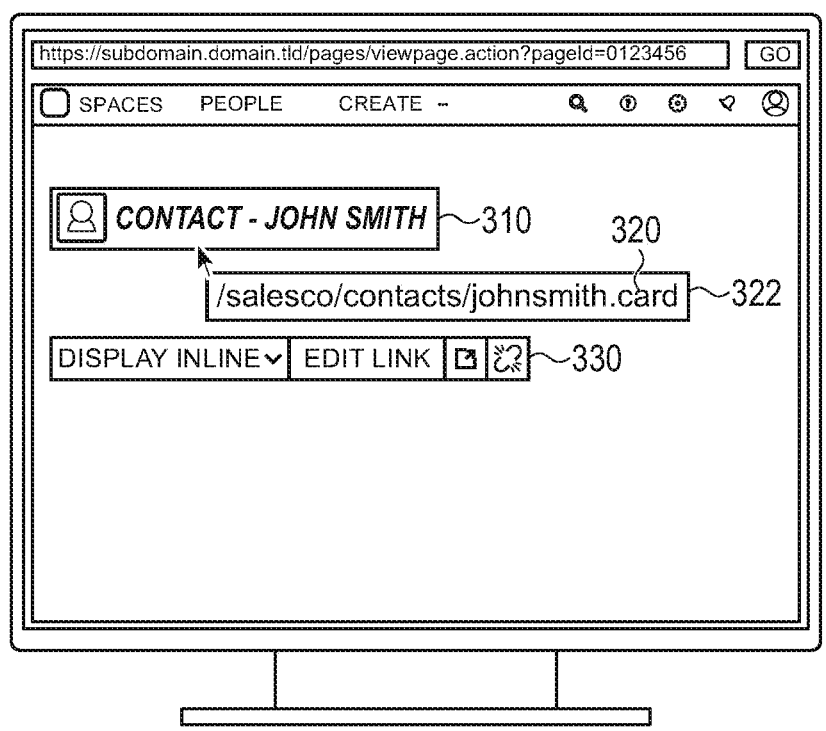
FIG. 3 depicts an example selectable graphical object.

FIG. 3 depicts an example selectable graphical object, specifically a contact card. As a result of the sequence of operations described above with respect to FIGS. 2A-2C, the system may generate a contact card 310, which is displayed as a tile or region that is selectable by the user by a mouse, touch, or other similar user-interface input command. The tile or region of the contact card 310 (also referred to herein as a card graphical object or card tile) replaces the link path used to generate the selectable graphical object. The tile or region of the contact card 310 includes a portion of the hosted data retrieved from the external platform services which, in this case, includes the contact's name "John Smith" and a thumbnail image associated with the contact. The thumbnail image may include a photographic image of the person associated with the contact or may include a representative headshot designating the contact as being associated with a single person (as opposed to a group of people or team). In some cases, the contact card 310 may also include a logo or graphic that is associated with the external platform service (e.g., "Sales Co") or otherwise indicate the source of the data.

In response to the contact card 310 being selected, the user may be redirected to a graphical user interface provided by the external platform service and directed to a page or record associated with the displayed contact. In this example, the user may be redirected to a document or record that includes further hosted data provided by Sales Co's content store. Redirection may cause the user to leave the computing environment provided by the hosted platform services so that navigation can continue using the external platform services' (Sales Co's) computing environment and resources. Alternatively, in response to the card 310 being selected, instead of being redirected, a separate floating window or user-interface portal may be generated and the additional hosted data related to the contact may be displayed in the floating window or portal.

The action performed in response to selection of the contact card 310 may depend on the authentication status of the user operating the graphical user interface. For example, the contact card 310 may be created by a first user having been authenticated and having been granted a broad set of permissions with respect to the hosted data associated with the contact card 310. Subsequent to creation of the contact card 310, a second, different user may view the content including the contact card 310 and the second user may have a different authentication status or set of permissions with respect to the hosted content being provided by the external platform services. If the second user is not authenticated and/or does not have a set of permissions allowing "read" or "view" access to the hosted data, the selection of the contact card may not redirect the second user to a separate graphical user interface having the additional contact information or may not otherwise be provided with access to the hosted data (until an authentication is complete and appropriate permissions are established). In some cases, the second user may be redirected to a portal of the external platform services that displays a message regarding the authentication status of the user, explaining that access is denied, or other information other than the hosted contact associated with the path associated with the contact card 310. In some instances, the portal of the external platform services may provide a series of prompts or editable fields that allow the second user to enter login credentials and establish an authentication protocol.

As shown in FIG. 3, the contact card may be associated with the complete path or command line 320 depicted, for purposes of illustration, in floating window 322. In this example, the complete path 320 includes a first portion designating the link insertion command (e.g., "/salesco"), a second portion indicating a path or portion of a path (e.g., "contacts/johnsmith") and a third portion including a format designation (e.g., ".card"). In this example, the format designation is set off by a special character, here a period ".". However, in other implementations, the format designation may be set off by a different character (e.g., another forward slash "/") or a group of characters (e.g., "\\"). In even other implementations, the format designation is not set off from the remainder of the path by any character. The floating window 322 depicting the complete path 320 may be displayed in response to a mouse-over or hover user input action (e.g., a selection cursor arrow is positioned over the tile region of the contact card 310 and not moved for more than a threshold or predetermined amount of time or dwell). In other cases, the complete path 320 may not be displayed to the user through the graphical user interface once the selectable graphical object is created.

As also shown in FIG. 3, in response to the creation of the selectable graphical object (contact card 310), an object toolbar 330 may be displayed in a region adjacent to the selectable graphical object. The object toolbar 330 may only be displayed in response to a particular user input (e.g., a mouse-over or hover input) or entry of a special command (right-button mouse selection). In some cases, the displayed content must be in an edit mode or otherwise be editable by the user in order to display the object toolbar 330. The user may also need to have an appropriate set of permissions with respect to the hosted content platform in order to view or engage with the object toolbar 330 (which may be different than the set of permissions associated with the hosted content of the external platform services, discussed above).

Figure 6:
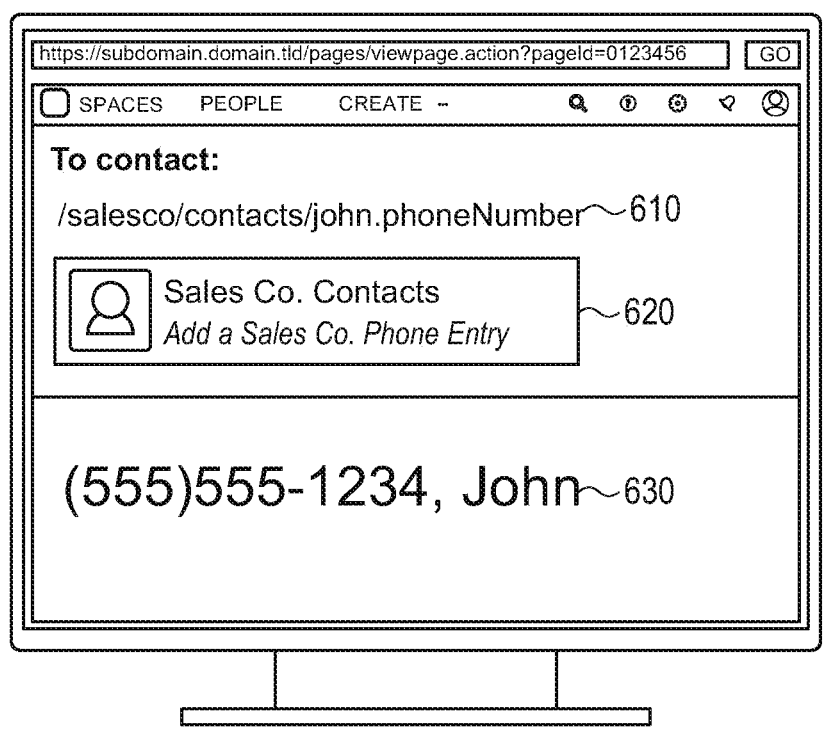
FIG. 6 depicts another example selectable graphical object.

The object toolbar 330 may include multiple selectable options including, without limitation, a first selectable option for changing the format designation of the contact card 310. For example, the first selectable option may allow the user to change from a contact card or inline format to a table format, an embedded format, a phone number format, or other format designation for the selectable graphical object (contact card 310). Other format designation results are depicted in FIGS. 4 and 6, discussed below. A second selectable option may allow the user to view and edit the complete link path 320. Selection of the second selectable option may invoke or cause a display of an editable field displaying the complete link path 320, which may be modified by the user by keyboard, mouse, touchscreen, or other input device. The object toolbar may include additional selectable options for copying or sharing the contact card 310 or linking the contact card 310 with other operations or data objects provided by the host platform services.

FIG. 4 depicts another example selectable graphical object, specifically, a table of contacts. As a result of the sequence of operations described above with respect to FIGS. 2A-2C, the system may generate a link table 410, which is displayed as a table of entries that are selectable by the user by a mouse, touch, or other similar user-interface input command. The link table 410 replaces the link path used to generate the selectable graphical object. The link table 410 includes a portion of the hosted data retrieved from the external platform services which, in this case, includes specific data associated with a group or set of contacts. Specifically, names, phone numbers, titles, addresses, and other information associated with each contact is displayed within each cell of the link table 410. In this example, the link table 410 may contain static data that represents the state of the data at the time it was retrieved and is not updated in accordance with changes to the hosted data made on the external platform service (after the link has been created). In other examples, like the embedded table example of FIG. 9, the contents of the table may be dynamically modified to reflect changes to the hosted data made on the external platform service.

Selection of elements contained in each of the cells of the link table 410 may result in a redirection or display of different hosted data provided by the external platform services. For example, selection of text within the email cells 412 of the link table may redirect the user to an email client or other messaging interface for composing a message to the respective contact. In some cases, selection of text within the email cells 412 redirects the user to a messaging service provided by the external platform service, which may present a communication interface for composing a message to the respective contact. Similarly, selection of text within the phone number cell 414 may initiate a phone call or redirect the user to a telephony interface for placing a call. Selection of other text associated with other cells 416 may result in a redirection to a service or content provided by the external platform services, similar to as described above with respect to the contact card 310 of FIG. 3.

Similar to the previous examples, display of content within the cells of the table and/or actions that may be performed in response to selections of different portions of the link table 410 may depend on the authentication status and/or set of permissions granted to the particular user viewing the link table 410. In some instances, depending on the set of permissions associated with the user, some portions of the link table 410 may display the hosted content, for hosted content that is permissible to view, and other portions of the link table 410 may be hidden from the user or have placeholder graphics inserted into respective cells indicating that access to the data is not available.

Also similar to the previous examples, a complete link path 420 may be displayed in a floating window 422 or other similar graphical element. The link table 410 may be associated, in some cases, with a single link path 420, which may be used to refer to a location or set of results provided by the external platform services. In other cases, the link table 410 may be associated with multiple link paths, each link path associated with a different location or result provided by the external platform services. For example, each row or group may be associated with a distinct link path. While not displayed explicitly in the current state of the link table 410, an object toolbar similar to the object toolbar 330 of FIG. 3 may also be displayed in a region adjacent to the link table 410 and allow for the selection of different format designations, allow for the link path to be edited, and provide other functionality associated with the link table 410 consistent with the previous description. When changing from a link table format to a card or other single-entity format, the link table 410 may be replaced with multiple single-entity format objects, each object corresponding to a row of the link table 410.

FIGS. 3 and 4 depict alternative selectable graphical objects that may be generated using the hierarchical path interpreter module or path interpreter module. In some implementations, the path interpreter module analyzes hosted data retrieved from the external platform service and automatically determines a format for the selectable graphical object. In particular, the path interpreter module may analyze the received data and, in accordance with a determination that the received (hosted) data corresponds to a single contact, entity, or item, the path interpreter module may cause the creation and display of a card or single-entity selectable graphical object similar to the example depicted in FIG. 3. In accordance with a determination that the received (hosted) data corresponds to multiple contacts, entities, or items, the path interpreter module may cause the creation and display of a link table similar to the example depicted in FIG. 4. In some cases, the received (hosted) data is analyzed to determine a type of data that is received, which may be used to determine the format of the selectable graphical object to be inserted. For example, in accordance with a determination that the data includes an image or graphical object type of data, the path interpreter module may automatically determine that the format will correspond to an embedded object format, similar to the example depicted in FIGS. 7A and 7B. Similarly, in accordance with a determination that the data corresponds to a phone number or other electronically addressable contact information, the path interpreter module may automatically create a selectable phone number object, similar to the example depicted in FIG. 6.

The format of the object may be determined by a format designation portion of the link path. As described previously, the system may append the link path with a format designation set off from the rest of the path with a special character like a period "." or a slash "/". In some cases, the system prompts the user for the type of object to be created (e.g., shown in the floating window 232 of FIG. 2C). Alternatively, the system automatically determines the format of the object and creates the object without additional input from the user. As explained above with respect to previous examples, the user may change the default or automatic format selection using, for example, the object toolbar interface or other selectable option.

Figure 5:
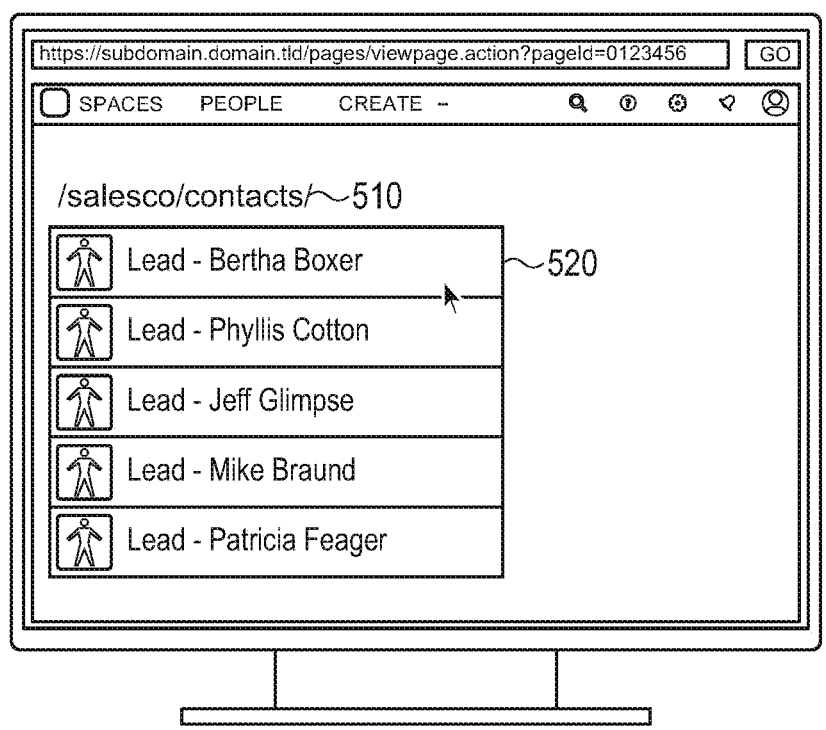
FIG. 5 depicts an example floating window with multiple selectable options corresponding to data hosted by an external platform service.

FIG. 5 depicts an alternative floating window or floating window object that includes multiple options obtained via the API call or request. In accordance with the creation of a link-insertion command similar to the example provided above with respect to FIGS. 2A-2C, a path interpreter module may return multiple results as a result of an API call or request. Specifically, the path interpreter module may formulate an API call to the target content source or external platform service (e.g., Salesco) based on a portion of the link path 510 (e.g., "contacts"). In response to the API call or request, the target content source may query an appropriate content store and provide a set of results or items that corresponds to the API request. The set of results may be determined based on the set of permissions granted to the user associated with the client device operating the graphical user interface.

As depicted in FIG. 5, at least a portion of the set of results is displayed in the floating window 520. Each item displayed in the floating window 520 may be selectable by the user. In response to a selection of a respective option, the system may modify the link path 510 to reflect the selection made by the user by including a portion of the received (hosted) data. By way of example, a selection of the item labeled "Lead—Bertha Boxer" may result in the link path 510 being edited by the system to include the additional path text "berthaboxer" or "boxer." As an additional example, selection of one of the items displayed in the floating window 520 may result in a modification of the link path to include a predicted next level in the data hierarchy, which may be contacts designated as "leads" or contacts associated with a particular project. In response to the selection and resulting modification of the link path 510, the link path interpreter may formulate an additional API call or request to the target content source. The results of the additional call or request may be used to present additional items or propose additional predicted completion text for the link path 510. Alternatively, the link path interpreter may filter pre-fetched data to display items or propose additional predicted completion text that correspond to the modified link path (resulting from an earlier selection of an item in the floating window 520).

FIG. 6 depicts another example selectable graphical object that may be created using the techniques described herein. Specifically, as a result of the sequence of operations described above with respect to FIGS. 2A-2C, the system may generate a selectable link 630 using the link path 610. In the example of FIG. 6, the selectable graphical object is a single-line contact item 630, which, in this case, includes a phone number and contact name. The single-line contact item 630 replaces the link path 610 used to generate the selectable graphical object. In the illustration of FIG. 6, the lower portion of the figure represents the graphical user interface after the creation of the single-line contact item 630, which replaces the link path 610 displayed in the upper portion of the figure. The phone number and contact name may be a portion of the received (hosted) data obtained using the above-described techniques. The single-line contact item 630 may be created and displayed automatically in accordance with a determination that the hosted data corresponds to a particular type or classification, as discussed previously. The single-line contact item 630 may also be generated in response to a selection of an option displayed in the link creation object 620.

In the example of FIG. 6, the link path 610 includes a format designation ".phoneNumber" indicating that the format of the selectable graphical object should be displayed in accordance with the single-line contact item 630 including a display of the phone number. The single-line contact item 630 is selectable and may redirect the user to a telephony application for placing a telephone call or redirect the user to content hosted by the external platform service, which is associated with the displayed content item 630. Other actions, operations, and functionality discussed with respect to previous examples, including the use of an object toolbar, user permissions for access, and actions performed in response to selection of the selectable graphical object, may also apply to the example of FIG. 6, an explicit discussion of which is omitted to reduce redundancy.

Figure 7A:
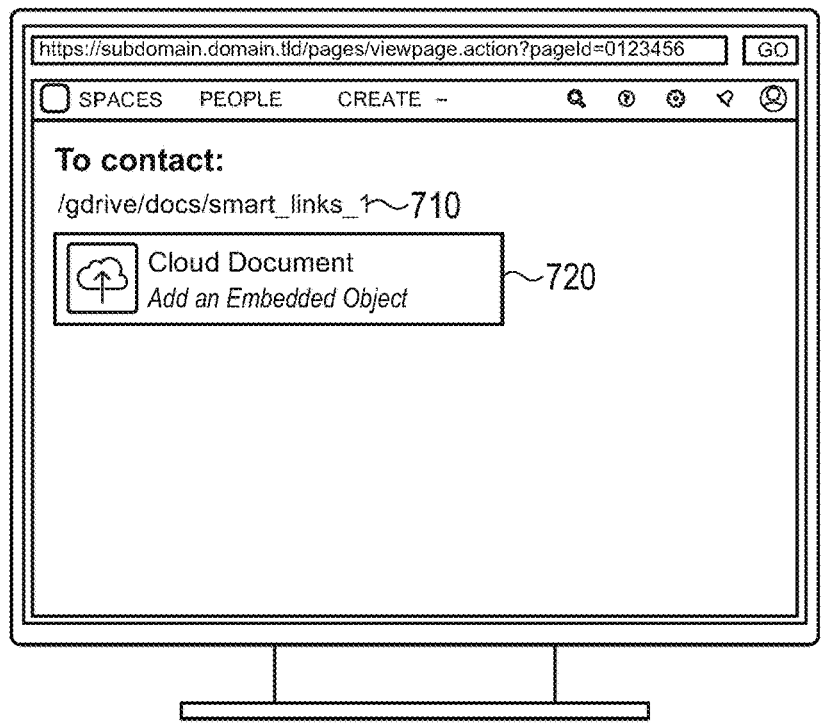
FIGS. 7A-7B depict another example selectable graphical object having embedded content hosted by an external platform service.
Figure 7B:
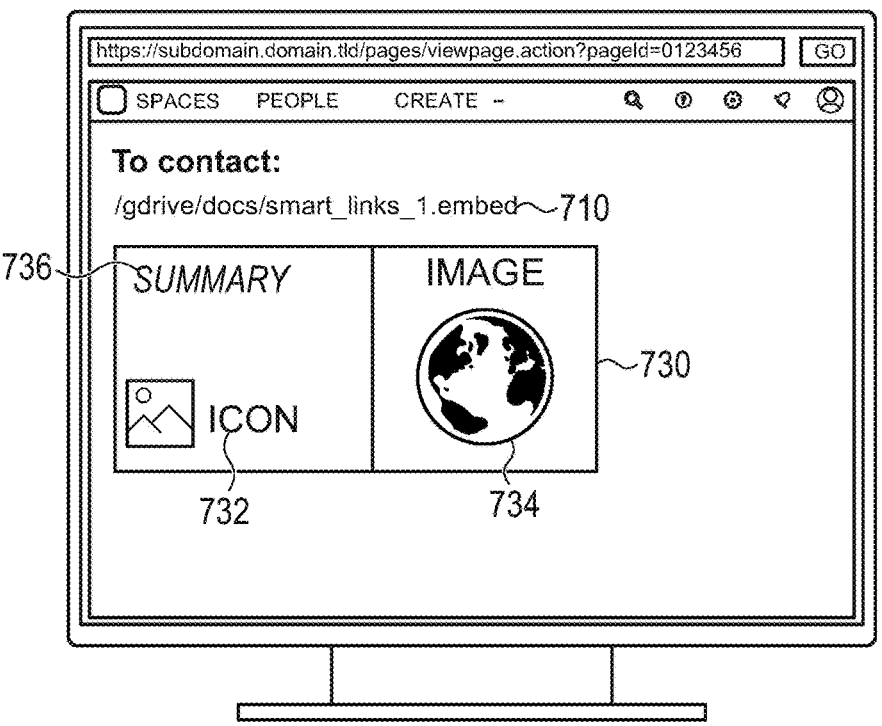

FIGS. 7A and 7B depict another example selectable graphical object that may be created using the techniques described herein. Specifically, as a result of the sequence of operations described above with respect to FIGS. 2A-2C, the system may generate a selectable embedded object 730 using the link path 710. Similar to previous examples discussed herein, the link path 710 may be dynamically constructed using a series of API calls to an external platform service or target content source. In this example, the external platform service may be associated with a cloud-based document platform that is configured to store and share documents and other digital content for users that are registered with the document platform. The digital content may include word processing documents, images, movies, music, and other similar content.

In response to receiving hosted data corresponding to a final target or desired content, the system may cause the display of a link creation object 720, which, when selected, causes the link path 710 to be replaced with an embedded content object 730 (shown in FIG. 7B). For purposes of illustration, the full link path is displayed in FIG. 7B in order to demonstrate the addition of the format designation (".embed") which results in the graphical selectable object being displayed as an embedded object.

As shown in FIG. 7B, the embedded object 730 includes multiple regions and elements. Specifically, the embedded object 730 includes an image 734, which could also include a movie clip, animated GIF, or other type of graphical object. The embedded object 730 also includes a summary 736, which may include text extracted from the hosted data received from the external platform service. The embedded object 730 may also include additional elements including an icon 732 or other information associated with the external platform service. Other elements that may also be displayed in the embedded object 730 include, without limitation, embedded graphs, charts, audio content, video content, and the like. In some cases, the embedded object 730 includes an iframe, ajax, or other similar object that references content provided by an external website or URL.

Selection of the embedded object 730 may redirect or otherwise result in the display of content provided by the external platform service, similar to other examples as described above with respect to previous figures. Other actions, operations, and functionality discussed with respect to previous examples, including the use of an object toolbar, user permissions for access, and actions performed in response to selection of the selectable graphical object, may also apply to the example of FIGS. 7A-7B, an explicit discussion of which is omitted to reduce redundancy.

Figure 8A:
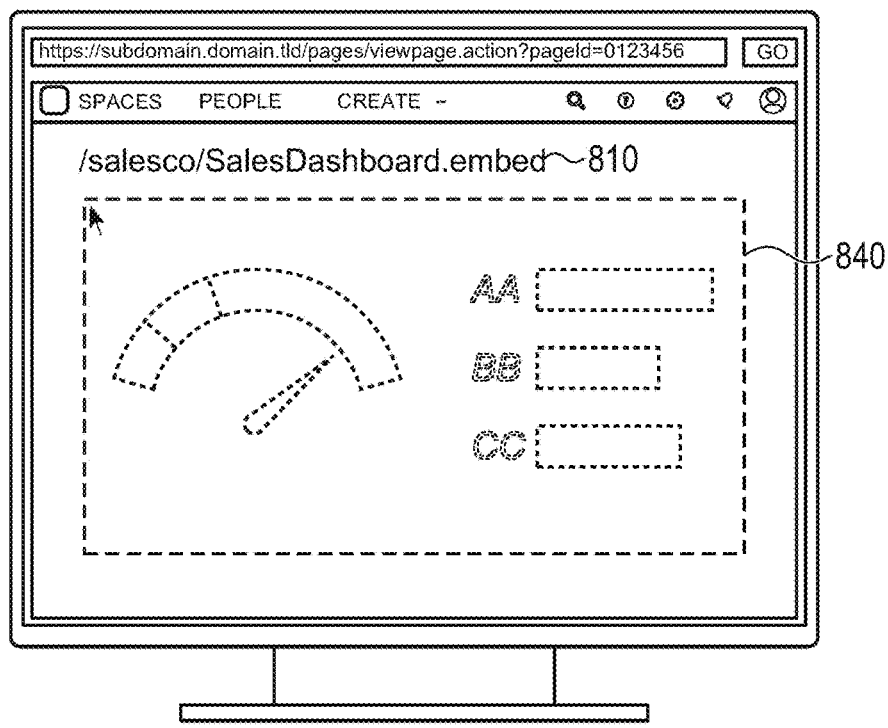
FIGS. 8A-8B depict another example selectable graphical object having embedded content hosted by an external platform service.
Figure 8B:
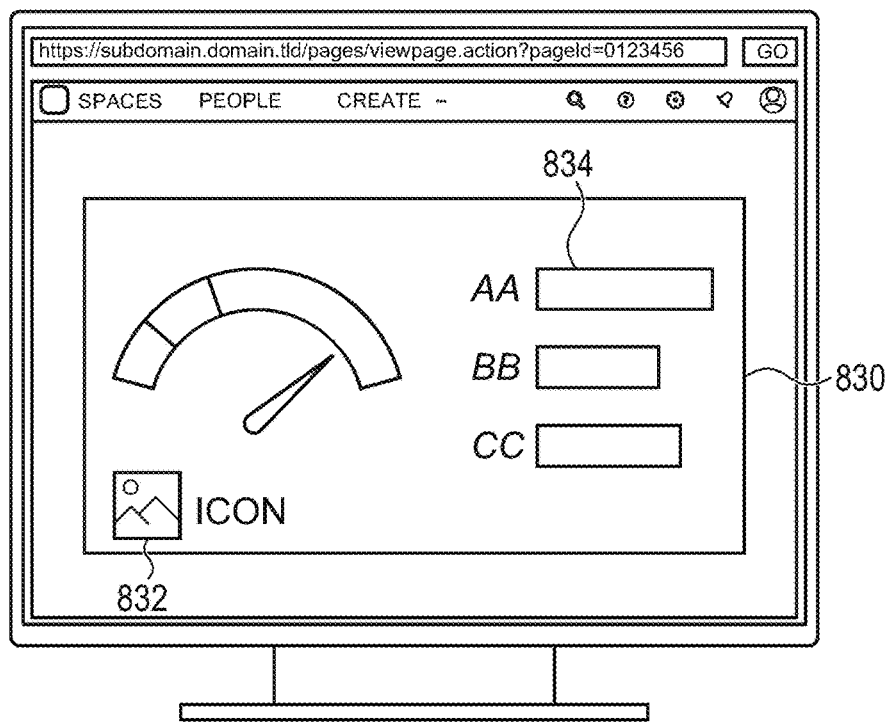

FIGS. 8A and 8B depict another example selectable graphical object that may be created using the techniques described herein. Specifically, as a result of the sequence of operations described above with respect to FIGS. 2A-2C, the system may generate a selectable embedded object 830 using the link path 810. Similar to previous examples discussed herein, the link path 810 may be dynamically constructed using a series of API calls to an external platform service or target content source. In this example, the external platform service may be associated with a cloud-based document platform that is configured to store and share documents and other digital content for users that are registered with the document platform. The digital content may include word processing documents, images, movies, music, and other similar content.

In this example, a preview graphical object 840 or transition graphical object is presented before the embedded object 830 is inserted into the document. Specifically, in response to receiving hosted data corresponding to a final target or desired content, the system may cause the display of preview graphical object 840, which may include at least a portion of the hosted data obtained from the external platform service. The preview graphical object 840 may allow the user to view and evaluate the placement and format of the content to be inserted into the document. In some cases, the user may use the cursor or other selection technique to position the embedded object 830 using the preview graphical object 840 as a guide. The preview graphical object 840 may be displayed in a ghosted or partially transparent format to allow the user to see content that would otherwise be hidden while placing the preview graphical object 840.

In response to a selection of the preview graphical object 840 or other user input, the link path 810 will be replaced with an embedded content object 830 (shown in FIG. 8B). For purposes of illustration, the full link path is displayed in FIG. 8A in order to demonstrate the addition of the format designation (".embed") which results in the graphical selectable object being displayed as an embedded object.

As shown in FIG. 8B, the embedded object 830 includes multiple regions and elements. Specifically, the embedded object 830 includes multiple graphical elements 834, which may correspond to a chart, table, graph, or other visual representation of data obtained from the external platform services. Because the content is inserted as an embedded object 830, the various graphical elements 834 may be dynamically updated to reflect changes made to the host data or content provided by the external platform service. In some cases, the graphical elements 834 and other embedded content is retrieved or refreshed every time the content displayed on the graphical user interface is initially displayed or loaded. The embedded object 830 may also be configured to poll or query the external platform service in accordance with a predetermined interval in order to maintain current or accurate content. Similar to the other examples provided herein, the embedded object 830 may also include additional elements including an icon 832 or other information associated with the external platform service.

Selection of the embedded object 830 may redirect or otherwise result in the display of content provided by the external platform service, similar to other examples as described above with respect to previous figures. Other actions, operations, and functionality discussed with respect to previous examples, including the use of an object toolbar, user permissions for access, and actions performed in response to selection of the selectable graphical object, may also apply to the example of FIGS. 8A-8B, an explicit discussion of which is omitted to reduce redundancy.

Figure 9:
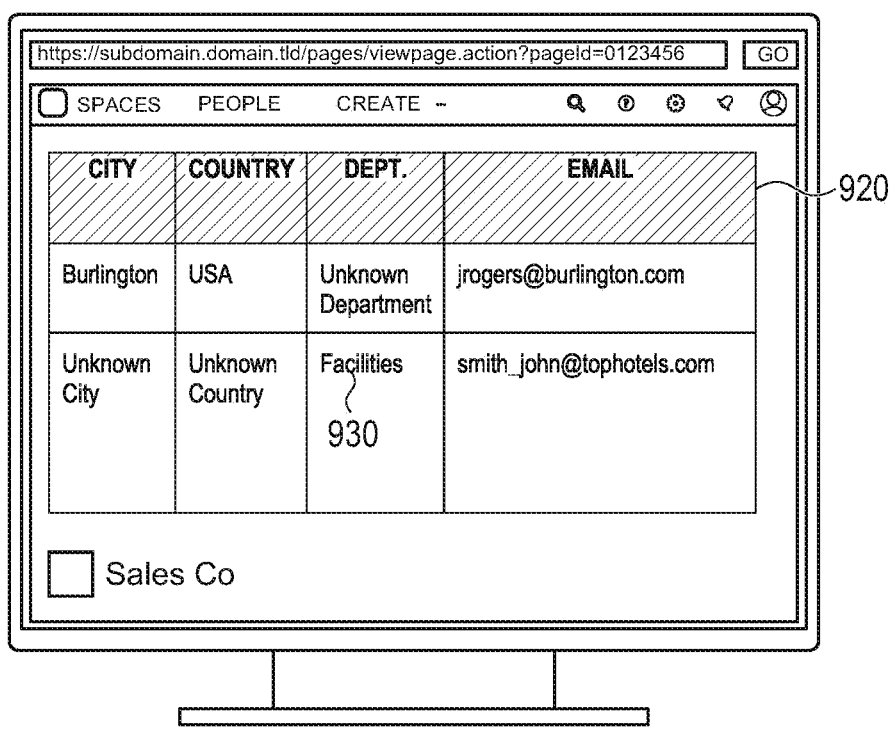
FIG. 9 depicts another example selectable graphical object having embedded content hosted by an external platform service.

FIG. 9 depicts another example embedded object 920. Specifically, the embedded object 920 includes an embedded view of a link table. The link table may be dynamically updatable to reflect changes made to the content or hosted data provided by the external platform services after the embedded object 920 has been created. Similar to the previous example, the link table of the embedded object 920 may include various selectable links or items 930 that redirect the user or the graphical user interface to the external platform services or another service like a telephony or email service in response to a user selection. In contrast to the previous example of FIG. 4, the table of the embedded object 920 may be updated to represent changes made to the hosted data. Similar to the other embedded examples provided herein, the table of the embedded object 920 may be created using an iframe, ajax, or other similar approach that references content provided by an external website or URL.

Figure 10:
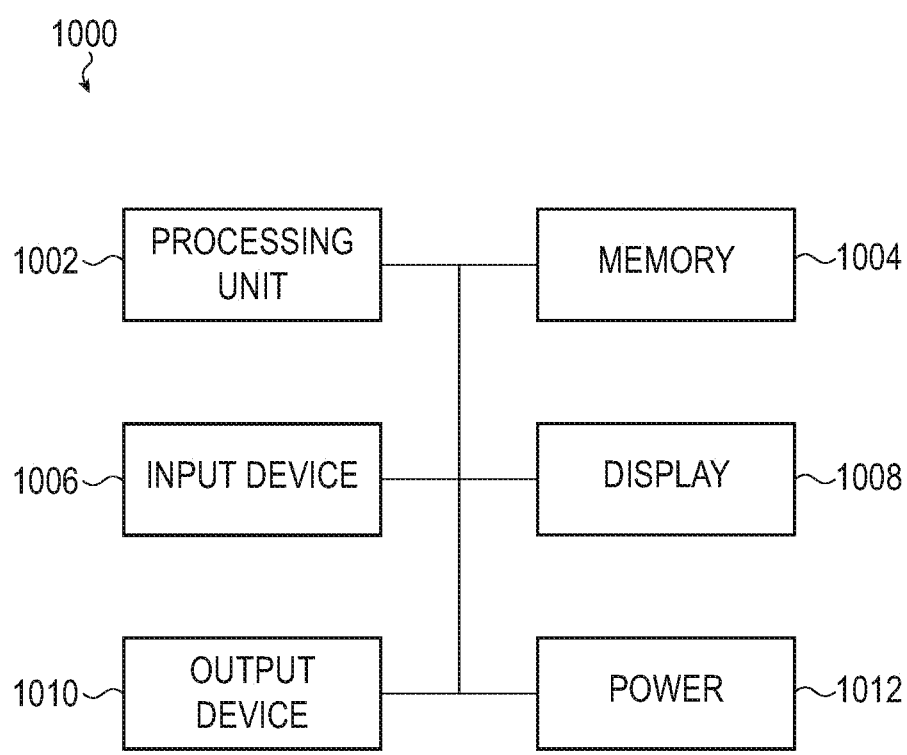
FIG. 10 depicts an example device in accordance with the embodiments described herein.

FIG. 10 depicts a sample electrical block diagram of an electronic device 1000 that may perform the operations described herein. The electronic device 1000 may in some cases take the form of any of the electronic devices described with reference to FIGS. 1-8B, including client devices, and/or servers or other computing devices associated with the system 100. The electronic device 1000 can include one or more of a display 1008, a processing unit 1002, a power source 1012, a memory 1004 or storage device, input devices 1006, and output devices 1010. In some cases, various implementations of the electronic device 1000 may lack some or all of these components and/or include additional or alternative components.

The processing unit 1002 can control some or all of the operations of the electronic device 1000. The processing unit 1002 can communicate, either directly or indirectly, with some or all of the components of the electronic device 1000. For example, a system bus or other communication mechanism can provide communication between the processing unit 1002, the power source 1012, the memory 1004, the input device(s) 1006, and the output device(s) 1010.

The processing unit 1002 can be implemented as any electronic device capable of processing, receiving, or transmitting data or instructions. For example, the processing unit 1002 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements. It should be noted that the components of the electronic device 1000 can be controlled by multiple processing units. For example, select components of the electronic device 1000 (e.g., an input device 1006) may be controlled by a first processing unit and other components of the electronic device 1000 (e.g., the display 1008) may be controlled by a second processing unit, where the first and second processing units may or may not be in communication with each other.

The power source 1012 can be implemented with any device capable of providing energy to the electronic device 1000. For example, the power source 1012 may be one or more batteries or rechargeable batteries. Additionally or alternatively, the power source 1012 can be a power connector or power cord that connects the electronic device 1000 to another power source, such as a wall outlet.

The memory 1004 can store electronic data that can be used by the electronic device 1000. For example, the memory 1004 can store computer-readable instructions that, when executed by the processing unit 1002 may cause the device 1000 to perform one or more of the operations or functions described herein. The memory 1004 can also be used to store other electronic data or content including, for example, audio and video files, documents and applications, device settings and user preferences, timing signals, control signals, and data structures or databases. The memory 1004 can be configured as any type of memory. By way of example only, the memory 1004 can be implemented as random access memory, read-only memory, flash memory, removable memory, other types of storage elements, or combinations of such devices.

In various embodiments, the display 1008 provides a graphical output, for example associated with an operating system, user interface, and/or applications of the electronic device 1000 (e.g., documentation creation user interface, a chat user interface, an issue-tracking user interface, an issue-discovery user interface). In one embodiment, the display 1008 includes one or more sensors and is configured as a touch-sensitive (e.g., single-touch, multi-touch) and/or force-sensitive display to receive inputs from a user. For example, the display 1008 may be integrated with a touch sensor (e.g., a capacitive touch sensor) and/or a force sensor to provide a touch- and/or force-sensitive display. The display 1008 is operably coupled to the processing unit 1002 of the electronic device 1000.

The display 1008 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 1008 is positioned beneath and viewable through a cover that forms at least a portion of an enclosure of the electronic device 1000.

In various embodiments, the input devices 1006 may include any suitable components for detecting inputs. Examples of input devices 1006 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 1006 may be configured to detect one or more particular types of input and provide a signal (e.g., an input signal) corresponding to the detected input. The signal may be provided, for example, to the processing unit 1002. As discussed above, in some cases, the input device(s) 1006 include a touch sensor (e.g., a capacitive touch sensor) integrated with the display 1008 to provide a touch-sensitive display. Similarly, in some cases, the input device(s) 1006 include a force sensor (e.g., a capacitive force sensor) integrated with the display 1008 to provide a force-sensitive display.

The output devices 1010 may include any suitable components for providing outputs. Examples of output devices 1010 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 1010 may be configured to receive one or more signals (e.g., an output signal provided by the processing unit 1002) and provide an output corresponding to the signal.

In some cases, input devices 1006 and output devices 1010 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth™, IR, and Ethernet connections.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A computer-implemented method of rendering remotely hosted data of a first platform in a graphical user interface of a second platform different from the first platform, the computer-implemented method comprising:
    instantiating a client application of the second platform on a client device, the client application configured to display the graphical user interface having a content-creation field configured to receive textual input via a keyboard of the client device;
    receiving a first portion of the textual input in the content-creation field, the first portion of the textual input including a command character designating the first portion of the textual input as a link insertion command;
    before entry of the textual input is complete, analyzing the first portion of the textual input to determine at least a portion of a link path and determine a target content source hosted by the second platform based on a first portion of the link path;
    accessing, using an application programming interface, first hosted data hosted by the second platform, the first hosted data including one or more of additional link path data or target content data;
    causing display of at least a portion of the first hosted data in line with the textual input of the client application before the entry of the textual input is complete;
    receiving a second portion of the textual input in the content-creation field;
    analyzing the second portion of the textual input to determine an additional portion of the link path;
    accessing, using the application programming interface and the additional portion of the link path, second hosted data hosted by the second platform; and
    replacing the first and second portions of the textual input with at least a portion of the second hosted data, and rendering the at least a portion of the second hosted data in the content-creation field of the graphical user interface.

2. The computer-implemented method of claim 1, wherein:
    replacing the first and second portions of the textual input with the at least the portion of the second hosted data comprises creating a selectable graphical object within the content-creation field;
    the selectable graphical object comprises the at least the portion of the second hosted data; and
    when selected, the selectable graphical object is operable to redirect a user to the second platform.

3. The computer-implemented method of claim 1, wherein:
    in accordance with a determination that the second hosted data includes a last path component of the link path:
        analyzing the second hosted data to determine if the second hosted data corresponds to a single item or a list of items; and
        in accordance with the second hosted data corresponding to the list of items, generating a table in the content-creation field, and inserting the list of items into respective cells of the table.

4. The computer-implemented method of claim 1, wherein:
    in response to receiving the first portion of the textual input, a predicted completion text portion of the first portion of the textual input is displayed;
    the predicted completion text portion is displayed to the right of a cursor of the content-creation field; and
    the predicted completion text portion has a line weight or a color that is different than the first portion of the textual input.

5. The computer-implemented method of claim 4, wherein, in response to a user input, the predicted completion text portion is added to the textual input.

6. The computer-implemented method of claim 1, wherein:

in accordance with a determination that the second hosted data comprises a list of items, replacing the first and second portions of the textual input with a link table;
the link table includes the at least the portion of the second hosted data; and
when selected, content displayed in the link table is operable to redirect a user to the second platform.

7. The computer-implemented method of claim 1, wherein:
in accordance with a determination that the second hosted data comprises a single item, replacing the first and second portions of the textual input with a card graphical object;
the card graphical object comprises the at the least the portion of the second hosted data; and
when selected, the card graphical object is operable to redirect a user to the second platform.

8. The computer-implemented method of claim 1, wherein:
in response to accessing the second hosted data, causing display of a floating window object in the graphical user interface;
the floating window object includes a set of selectable items; and
at least one item of the set of selectable items corresponds to the at least the portion of the second hosted data.

9. The computer-implemented method of claim 8, wherein:
in response to a selection of an item of the set of selectable items, causing display of additional text in line with the textual input of the client application; and
the additional text corresponds to a respective portion of the second hosted data associated with the selected item.

10. A computer-implemented method of rendering remotely hosted data of a first platform in a graphical user interface of a second platform, the computer-implemented method comprising:
executing a client application of the second platform using a processor of a client device, the client application configured to display the graphical user interface having a field configured to receive textual input;
receiving a first portion of the textual input in the field, the first portion of the textual input including a first command character designating the first portion of the textual input as a link insertion command;
receiving a second portion of the textual input in the field separated from the first portion by a second command character designating the second portion of the textual input as a portion of a hierarchical string;
before entry of the textual input is complete, analyzing the second portion of the textual input to identify the first platform;
requesting via an application programming interface of the first platform, first hosted data;
receiving, using the application programming interface, first hosted data provided by the first platform, the first hosted data including one or more of additional link path data or target content data;
causing display of at least a portion of the first hosted data in line with the textual input, before the entry of the textual input is complete;
receiving a third portion of the textual input in the field;
analyzing the third portion of the textual input to determine an additional portion of a link path;
requesting via the application programming interface of the first platform, first hosted data;
receiving, using the application programming interface and the additional portion of the link path, second hosted data hosted by the first platform; and
replacing the first, second, and third portions of the textual input with a selectable graphical object rendered within the field configured to receive the textual input, the selectable graphical object including at least a portion of the second hosted data.

11. The computer-implemented method of claim 10, wherein the selectable graphical object is configured to redirect a user to the first platform in response to a user selection of the selectable graphical object.

12. The computer-implemented method of claim 10, wherein:
in response to receiving the second hosted data, displaying a floating window adjacent to the textual input; and
the floating window comprises at least one selectable item labeled with the at least the portion of the second hosted data.

13. The computer-implemented method of claim 10, wherein:
in accordance with the second hosted data corresponding to multiple items, modifying the textual input to include a format designation portion;
the format designation portion is operable to cause the selectable graphical object to be displayed as a table of items; and
the table of items corresponds to the multiple items of the second hosted data.

14. The computer-implemented method of claim 10, wherein the first platform is configured to authenticate a user associated with the client device prior to providing access to the first hosted data and the second hosted data.

15. A computer-implemented method of generating a selectable graphical object, the computer-implemented method comprising:
executing a documentation application using a processor of a client device, the documentation application displaying a graphical user interface having an editable field configured to receive a textual input;
receiving a first portion of the textual input in the editable field, the first portion of the textual input including a first command character designating the first portion of the textual input as a link insertion command;
receiving a second portion of the textual input in the editable field, the second portion separated from the first portion by a second command character designating the second portion of the textual input as a portion of a hierarchical string;
before entry of the textual input is complete, analyzing the second portion of the textual input to determine an external platform service;
accessing, using an application programming interface, first hosted data hosted by the external platform service, the first hosted data including one or more of additional link path data or target content data;
displaying a set of selectable items over the editable field configured to receive the textual input, the set of selectable items corresponding to a format for displaying the first hosted data; and
in response to a user selection of one of the set of selectable items, replacing the textual input with a selectable graphical object rendered within the editable field, the selectable graphical object formatted in accordance with the user selection and including at least a portion of the first hosted data.

16. The computer-implemented method of claim 15, wherein the set of selectable items includes a card format option and a table format option.

17. The computer-implemented method of claim 16, wherein, in response to a selection of the table format option, the selectable graphical object includes a table, cells of the table comprising the target content data obtained from the external platform service.

18. The computer-implemented method of claim 16, wherein, in response to a selection of the card format option, the selectable graphical object includes a tile, the tile displaying at least a portion of the target content data obtained from the external platform service.

19. The computer-implemented method of claim 15, wherein the external platform service is a customer relationship management system.

20. The computer-implemented method of claim 19, wherein the target content data comprises contact data corresponding to a list of customer contacts managed by the customer relationship management system.

\* \* \* \* \*